United States Patent
Yoon et al.

(10) Patent No.: US 11,916,283 B2
(45) Date of Patent: Feb. 27, 2024

(54) COMPACTED ANTENNA MODULE WITH IMPROVED PERFORMANCE FOR ELECTRONIC DEVICE

(71) Applicant: Samsung Display Co., Ltd., Yongin-Si (KR)

(72) Inventors: Sangrock Yoon, Hwaseong-si (KR); Kiseo Kim, Yongin-si (KR)

(73) Assignee: Samsung Display Co., Ltd., Yongin-Si (KR)

(*) Notice: Subject to any disclaimer, the term of this patent is extended or adjusted under 35 U.S.C. 154(b) by 193 days.

(21) Appl. No.: 17/463,036

(22) Filed: Aug. 31, 2021

(65) Prior Publication Data

US 2022/0190466 A1   Jun. 16, 2022

(30) Foreign Application Priority Data

Dec. 16, 2020   (KR) .................. 10-2020-0176478

(51) Int. Cl.
*H01Q 1/24* (2006.01)
*H04M 1/02* (2006.01)
(Continued)

(52) U.S. Cl.
CPC ........... *H01Q 1/243* (2013.01); *G06F 3/0443* (2019.05); *H01Q 9/065* (2013.01); *H04M 1/0268* (2013.01); *H04M 1/0277* (2013.01)

(58) Field of Classification Search
CPC ...... H05K 1/00; H05K 5/0017; H05K 5/0018; H05K 5/0247; H01Q 1/243; H01Q 1/364
See application file for complete search history.

(56) References Cited

U.S. PATENT DOCUMENTS

| 9,543,542 | B2 | 1/2017 | Kim et al. |
| 10,381,750 | B2 | 8/2019 | Jung et al. |

(Continued)

FOREIGN PATENT DOCUMENTS

| JP | 6000298 B2 | 9/2016 |
| KR | 10-2010-0041208 A | 4/2010 |

(Continued)

OTHER PUBLICATIONS

Syamimi Mohd Norzeli, Ismarani Ismail, Norashidah Md Din, Mohd Tarmizi Ali , Sobhan Saravani, and Ali Abd Almisreb, "Design of High Gain Microstrip Patch Reader Array Antenna with Parasitic Elements for UHF RFID Application", International Journal of Engineering & Technology, 7 (4.35) (2018) 463-467, 5 pages, Institute of Energy Infrastructure, UNITEN Kajang, Selangor 43000, Malaysia, Faculty of Electrical Engineering (FKE), UiTM Shah Alam, Selangor 40450, Malaysia.

(Continued)

*Primary Examiner* — Yuwen Pan
*Assistant Examiner* — Angelica Perez
(74) *Attorney, Agent, or Firm* — Innovation Counsel LLP

(57) ABSTRACT

An electronic device includes a base layer including a flat region and a bendable region extending from the flat region, a display module disposed on the base layer and overlapping the flat region, a window disposed on the display module and having a display region and a non-display region adjacent to the display region, and an antenna layer overlapping the non-display region of the window and disposed on one side of the display module, wherein the antenna layer includes an antenna module and an insulating layer surrounding the antenna module.

20 Claims, 10 Drawing Sheets

(51) Int. Cl.
*H01Q 9/06* (2006.01)
*G06F 3/044* (2006.01)

(56) References Cited

U.S. PATENT DOCUMENTS

| | | | |
|---|---|---|---|
| 10,403,964 B2 | 9/2019 | Yoo et al. | |
| 2014/0328084 A1* | 11/2014 | Chuang | H01Q 1/243 |
| | | | 361/767 |
| 2019/0014669 A1* | 1/2019 | Ahn | G06F 1/1626 |
| 2019/0198995 A1* | 6/2019 | Ryoo | H01Q 21/20 |
| 2019/0279597 A1* | 9/2019 | Park | G09G 5/006 |
| 2020/0076035 A1 | 3/2020 | Huh et al. | |
| 2020/0083595 A1 | 3/2020 | Cai et al. | |
| 2020/0209995 A1* | 7/2020 | So | H01Q 1/24 |
| 2022/0131279 A1* | 4/2022 | Kim | H01Q 1/364 |

FOREIGN PATENT DOCUMENTS

| | | |
|---|---|---|
| KR | 10-2015-0070646 A | 6/2015 |
| KR | 10-2016-0047682 A | 5/2016 |
| KR | 10-2019-0019802 A | 2/2019 |
| KR | 10-2028352 B1 | 10/2019 |
| KR | 10-2020-0005010 A | 1/2020 |
| KR | 10-2093326 B1 | 3/2020 |
| KR | 10-2126276 B1 | 6/2020 |

OTHER PUBLICATIONS

Mekala Harinath Reddy, R.M. Joany, M. Jayasaichandra Reddy; M. Sugadev, and E. Logashanmugam, "Bandwidth Enhancement of Microstrip Patch Antenna using Parasitic Patch", 2017 IEEE International Conference on Smart Technologies and Management for Computing, Communication, Controls, Energy and Materials (ICSTM), Veltech Dr.RR & Dr.SR University, Chennai, T.N., India. Aug. 2-4, 2017, pp. 295 298, 4 pages.

Wei Chen, Kai-Fong Lee, and R. Q. Lee, "Spectral-Domain Moment-Method Analysis of Coplanar Microstrip Parasitic Subarrays", Microwave and Optical Technology Letters / vol. 6, No. 3, Mar. 5, 1993, 157-161. 5 pages, Ohio 44315, United States.

Jean-Marie Floc'h, Ahmad El Sayed Ahmad, Anne Claude Tarot, Renaud Loison, Sophia Thizon, and Jean Yves Daden, "On the Design of Planar Printed Dipole Array Antennas", Wireless Engineering and Technology, 2012, 3, 203-209, 8 pages, Rennes, France, Colombes, France.

* cited by examiner

COMPACTED ANTENNA MODULE WITH IMPROVED PERFORMANCE FOR ELECTRONIC DEVICE

CROSS-REFERENCE TO RELATED APPLICATIONS

This U.S. non-provisional patent application claims priority under 35 U.S.C. § 119 of Korean Patent Application No. 10-2020-0176478, filed on Dec. 16, 2020, the entire contents of which are hereby incorporated by reference.

BACKGROUND

The present disclosure herein relates to an electronic device, and more particularly, to an electronic device with improved display performance and antenna performance.

An electronic device may include electronic modules. For example, the electronic device may be a portable terminal or a wearable device, and the electronic modules may include an antenna module, a camera module, or a battery module. As portable terminals become thinner and wearable devices become smaller, spaces for mounting electronic modules are gradually decreasing. As electronic devices become highly functional and develop into having higher specifications, the number of electronic modules included in electronic devices is increasing.

SUMMARY

In an embodiment, signal interference is minimized by disposing an antenna in a side space of a display module and an increase in thickness is prevented by using the space effectively.

An embodiment of the inventive concept provides an electronic device including a base layer, a display module, a window, and an antenna layer. The base layer includes a flat region and a bending region extending from the flat region. The display module is disposed on the base layer and overlaps the flat region. The window is disposed on the display module and has a display region and a non-display region adjacent to the display region. The antenna layer overlaps the non-display region of the window and is disposed on one side of the display module, wherein the antenna layer includes an antenna module and an insulating layer surrounding the antenna module.

In an embodiment, the base layer may include a base substrate and a circuit element layer disposed on the base substrate. The display module may include a display element layer disposed on the circuit element layer and an input sensing layer disposed on the display element layer.

In an embodiment, the antenna module may include a dipole antenna.

In an embodiment, the antenna module may contain silver (Ag) paste.

In an embodiment, the antenna module may include an antenna line disposed parallel to one side of the display module and a power supply line extending from the antenna line.

In an embodiment, a width of the antenna line in a first direction may be about 5 mm.

In an embodiment, the base layer may further include an antenna region defined between the flat region and the bending region.

In an embodiment, the antenna layer may be disposed on the antenna region.

In an embodiment, the electronic device may further include a circuit substrate which is disposed on the bending region and drives the display module.

In an embodiment, the antenna module may include an antenna line for radiating an antenna signal and a power supply line vertically extending from the antenna line, wherein the power supply line may be electrically connected to the circuit substrate.

In an embodiment, the electronic device may further include a pixel-driving chip which is disposed closer to the display module than the circuit substrate on the bending region.

In an embodiment, the power supply line may be connected to the circuit substrate across a region in which the pixel-driving chip is not disposed on the bending region.

In an embodiment, the circuit substrate may include a connector. The power supply line may include a first portion connecting the antenna line and the circuit substrate and a second portion electrically connected to the connector across the circuit substrate.

In an embodiment, the electronic device may further include a circuit substrate which is disposed on one side of the base layer and electrically connected to the display module, wherein the antenna module may be disposed between the display module and the circuit substrate on the base layer.

In an embodiment, the antenna module may be electrically connected to the circuit substrate.

In an embodiment of the inventive concept, an electronic device includes a base layer, a display module, a circuit substrate, and an antenna layer. The base layer includes a first region and a second region adjacent to the first region. The display module includes a display element layer disposed on the first region of the base layer. The circuit substrate is disposed on the second region of the base layer and drives the display module. The antenna layer is disposed on the base layer and is disposed, on a plane, between the display module and the circuit substrate. The antenna layer may include an antenna module electrically connected to the circuit substrate.

In an embodiment, the antenna layer may be disposed in the same layer as the display module.

In an embodiment, the antenna module may include an antenna line extending in a first direction and a power supply line extending vertically from the antenna line in a second direction crossing the first direction, wherein the power supply line may electrically connect the circuit substrate and the antenna line.

In an embodiment, the antenna module may include a dipole antenna.

In an embodiment, the antenna layer may further include an insulating layer surrounding the antenna module.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept.

DETAILED DESCRIPTION

Figure 1:
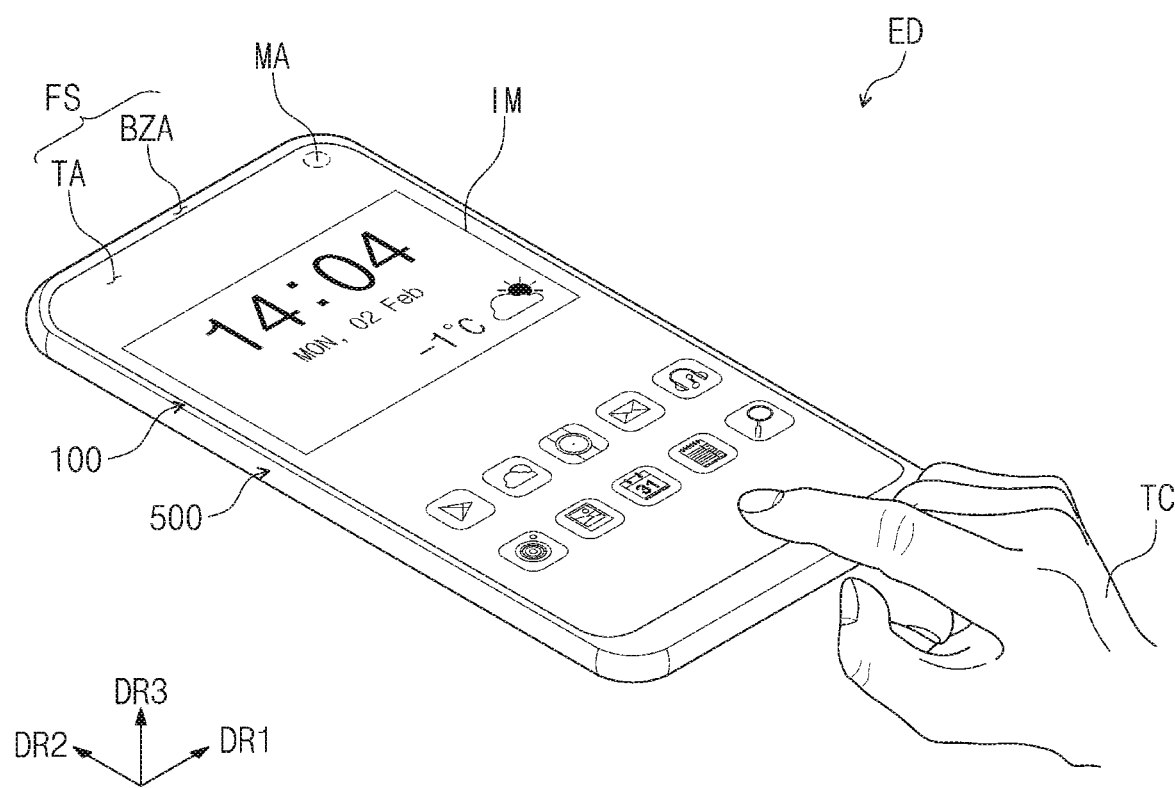
FIG. 1 is a perspective view of an electronic device according to an embodiment of the inventive concept.

In this specification, it will be understood that when an element (or region, layer, portion, etc.) is referred to as being "on", "connected to" or "coupled to" another element, it can be directly on, connected or coupled to the other element, or intervening elements may be present.

Like reference numerals refer to like elements throughout. In addition, in the drawings, the thicknesses, ratios, and dimensions of elements are exaggerated for effective description of the technical contents. As used herein, the term "and/or" includes any and all combinations that the associated configurations can define.

It will be understood that, although the terms first, second, etc. may be used herein to describe various elements, these elements should not be limited by these terms. These terms are only used to distinguish one element from another element. For example, a first element could be termed a second element without departing from the scope of the inventive concept. Similarly, the second element may also be referred to as the first element. The terms of a singular form include plural forms unless otherwise specified.

Terms, such as "below", "lower", "above", "upper" and the like, are used herein for ease of description to describe one element's relation to another element(s) as illustrated in the figures. The above terms are relative concepts and are described based on the directions indicated in the drawings.

It will be understood that the terms "include" and/or "have", when used in this specification, specify the presence of stated features, integers, steps, operations, elements, components and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the inventive concept will be described with reference to the accompanying drawings.

Referring to FIG. 1, an electronic device ED may display an image IM through a front surface FS of a window 100 of the electronic device ED. The front surface FS includes a display region TA and a non-display region BZA adjacent to the display region TA.

The front surface FS may be defined as being parallel to a plane defined by a first direction DR1 and a second direction DR2. The normal direction of the front surface FS, that is, the thickness direction of the electronic device ED is indicated by a third direction DR3. In this specification, the expression "when viewed on a plane" or "on a plane" may mean being viewed in the third direction DR3. A front surface, sometimes called an upper surface, and a rear surface, sometimes called a lower surface, of each of the layers or units described below are divided by the third direction DR3. However, directions indicated by the first to third directions DR1, DR2, and DR3 are relative concepts and may be converted into other directions, for example, opposite directions.

The electronic device ED displays the image IM through the display region TA. The image IM may include at least one of a still image or a moving image. FIG. 1 illustrates a watch and a plurality of icons as an example of the image IM.

The display region TA may have a tetragonal shape parallel to each of the first direction DR1 and the second direction DR2. However, the shape is merely illustrated as an example, and the display region TA may have various shapes.

The non-display region BZA may surround the display region TA. However, the embodiment of the inventive concept is illustrated as an example. The non-display region BZA may be disposed adjacent to only one side of the display region TA or may be omitted.

Meanwhile, the electronic device ED according to the inventive concept may sense a user's input TC applied from the outside. The user's input TC includes various types of external inputs such as a part of a user's body, light, heat, or pressure. In addition, the electronic device ED may sense not only an input contacting the electronic device ED, but also a close or adjacent input.

In this embodiment, the user's input TC is illustrated as being applied on the front surface by the user's hand. However, this is illustrated as an example, and the user's input TC may be provided in various forms as described above. Furthermore, the electronic device ED may also sense the user's input TC applied to a side surface or rear surface of the electronic device ED according to the structure of the electronic device ED.

Figure 2:
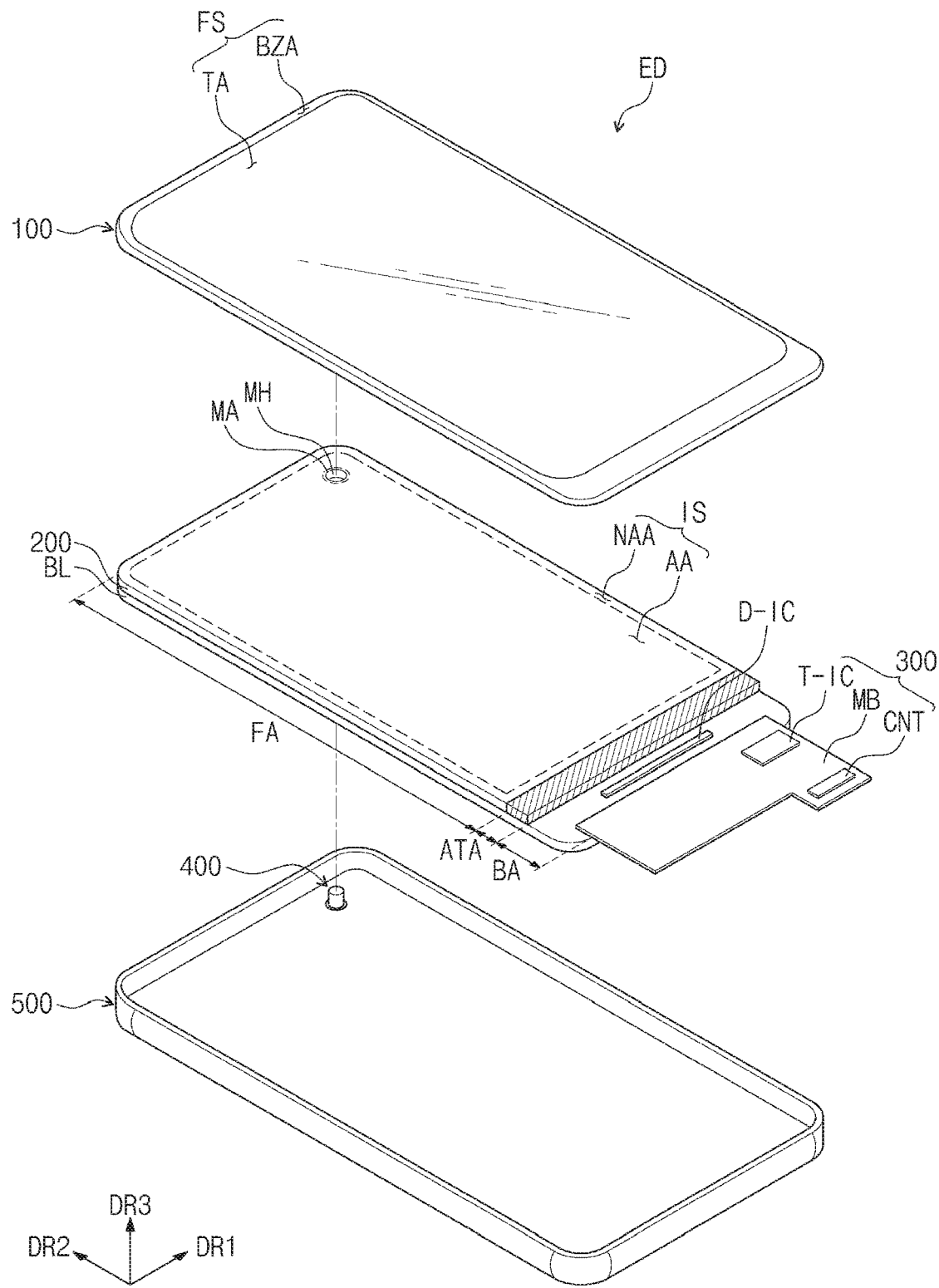
FIG. 2 is an exploded perspective view of the electronic device according to an embodiment of the inventive concept.

Referring to FIG. 2, the electronic device ED may include the window 100, a base layer BL, a display module 200, a circuit substrate 300, an electronic module 400, and an external case 500. The window 100 and the external case 500 are combined to define the exterior of the electronic device ED.

The window 100 is disposed on the display module 200 to cover a front surface IS of the display module 200. The window 100 may contain an optically transparent insulating material. For example, the window 100 may contain glass or plastic. The window 100 may have a multi-layered or single-layered structure. For example, the window 100 may have a stacked structure of a plurality of plastic films bonded with an adhesive, or a stacked structure of a glass substrate and a plastic film bonded with an adhesive.

The window 100 includes the front surface FS exposed to the outside. The front surface of the electronic device ED may be substantially defined by the front surface FS of the window 100. The display region TA may be an optically transparent region. The display region TA may have a shape corresponding to an active region AA defined in the display module 200. For example, the display region TA overlaps the entire surface of the active region AA or at least a portion of the active region AA. The image IM displayed in the active region AA of the display module 200 may be visually recognized from the outside through the display region TA.

The non-display region BZA may be a region which has a relatively low light transmittance compared to the display region TA. The non-display region BZA defines the shape of the display region TA. The non-display region BZA may be adjacent to and surround the display region TA.

The non-display region BZA may have a predetermined color. When the window 100 is provided as a glass or plastic substrate, the non-display region BZA may be a printed color layer or a deposited color layer on one surface of the glass or plastic substrate. Alternatively, the non-display region BZA may be formed by coloring a corresponding region of the glass or plastic substrate.

The non-display region BZA may cover a non-active region NAA of the display module 200 to block the non-active region NAA from being visually recognized from the outside. However, this is illustrated as an example and, regarding the window 100 according to an embodiment of the inventive concept, the non-display region BZA may be omitted.

Figure 3A:
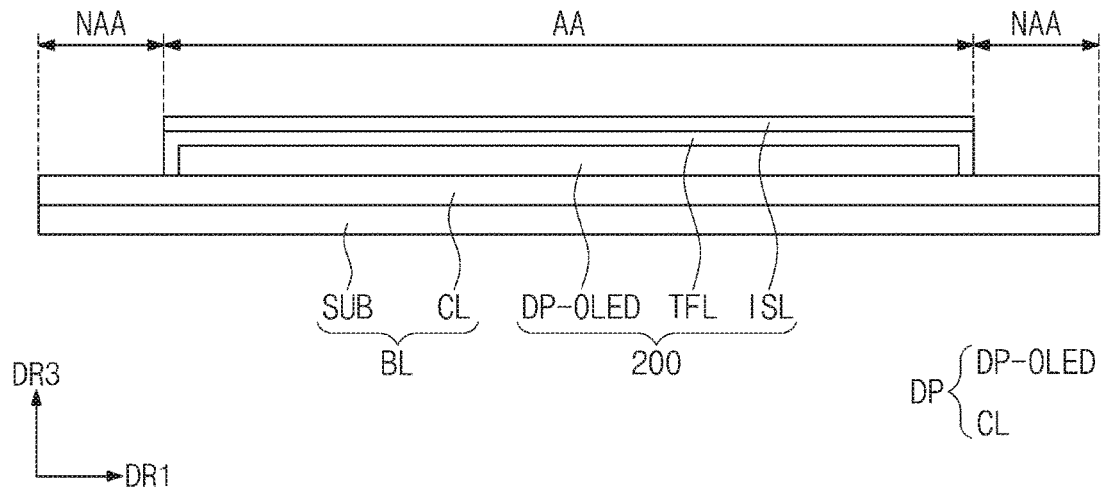
FIGS. 3A and 3B are cross-sectional views of the electronic device according to an embodiment of the inventive concept.
Figure 3B:
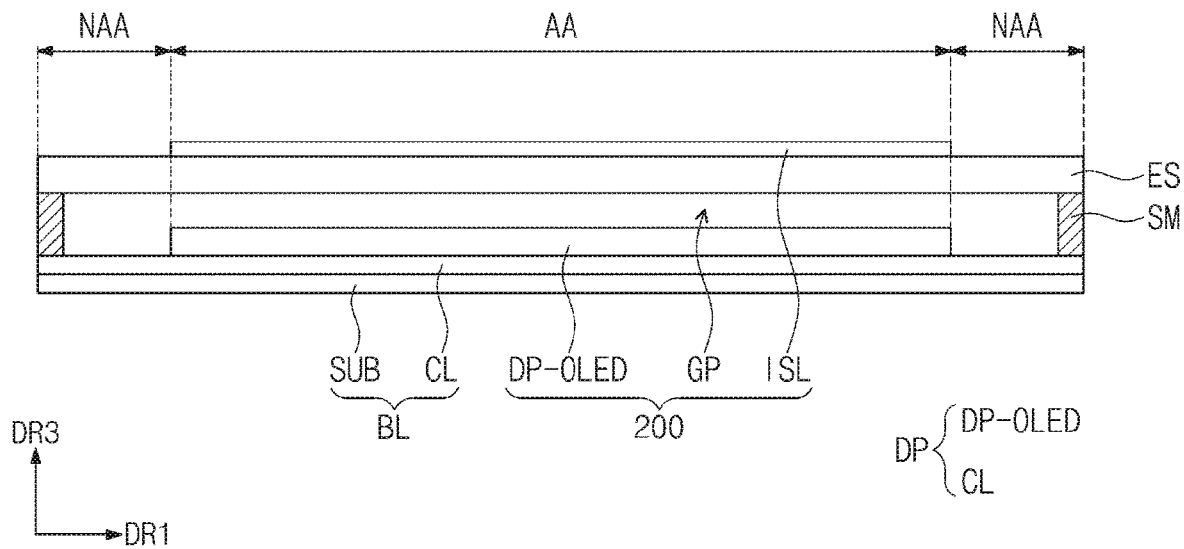

The base layer BL may include a base substrate SUB and a circuit element layer CL, e.g., see FIGS. 3A and 3B. The base substrate SUB may provide a base of the circuit element layer CL. The base substrate SUB and the circuit element layer CL may contain a bendable flexible material. The base layer BL may include a flat region FA and a bending region BA. The flat region FA is a region which overlaps the display region TA and is not bent, and the bending region BA is a portion to which the circuit substrate 300 is connected, and may correspond to a portion that is bent in a direction toward the lower surface of the base layer BL. The display module 200 may be disposed on the base layer BL.

The display module 200 may include a display element layer DP-OLED and an input sensing layer ISL, e.g., see FIGS. 3A and 3B. The display element layer DP-OLED may be a configuration which substantially generates the image IM. The image IM generated from the display element layer DP-OLED is visually recognized by a user from the outside through the display region TA. The input sensing layer ISL senses an external input TC applied from the outside. The display element layer DP-OLED and the circuit element layer CL may constitute a display panel DP (see FIGS. 3A, 3B, and 4 for example).

The display module 200 may be disposed in the flat region FA of the base layer BL. The active region AA of the display module 200 may be not only a display region in which the image IM is displayed, but also a sensing region in which the external input TC is sensed. The display region TA overlaps at least the active region AA. For example, the display region TA overlaps the entire surface of the active region AA or at least a portion of the active region AA. Accordingly, a user may visually recognize the image IM through the display region TA, or provide the external input TC. However, this is illustrated just as an example. In the active region AA, a region in which the image IM is displayed and a region in which the external input TC is sensed may be separated from each other.

The non-active region NAA may be a region which is covered by the non-display region BZA. The non-active region NAA is adjacent to the active region AA. The non-active region NAA may surround the active region AA. In the non-active region NAA, various signal lines, pads, or electronic elements for providing an electrical signal to the active region AA may be disposed. For example, as illustrated in FIG. 2, a pixel driving chip D-IC for providing an electrical signal to the active region AA may be disposed. Actually, the pixel driving chip D-IC can output an electrical signal for generating an image to be displayed through the active region AA. The non-active region NAA may not be visually recognized from the outside because the non-active region NAA is covered by the non-display region BZA.

In this embodiment, the display module 200 is assembled in a flat state with the active region AA and the non-active region NAA facing the window 100. However, this is illustrated just as an example, and a portion of the non-active region NAA of the display module 200 may be bent. At this time, since a portion of the non-active region NAA faces the rear surface of the electronic device ED, the non-display region BZA on the front surface of the electronic device ED may be reduced. Alternatively, a portion of the active region AA of the display module 200 may be assembled in a bent state. Alternatively, the non-active region NAA of the display module 200 according to an embodiment of the inventive concept may be omitted.

A module region MA may have a relatively higher transmittance than the active region AA when the module region MA and the active region AA have the same area. At least a portion of the module region MA may be surrounded by the active region AA. In this embodiment, the module region MA is spaced apart from the non-active region NAA. The module region MA is illustrated to be defined inside the active region AA so that all edges of the module region MA are surrounded by the active region AA.

The display module 200 may include a panel hole MH defined in the module region MA and penetrating the display module 200. The panel hole MH may penetrate at least one of the display panel DP or the input sensing layer ISL. The edge of the module region MA may be substantially spaced apart from the edge of the panel hole MH and extend along the edge of the panel hole MH. The edge of the module region MA may have a shape corresponding to the panel hole MH.

The circuit substrate 300 may be connected to one end of the display module 200. The circuit substrate 300 may be disposed on the bending region BA of the base layer BL. The circuit substrate 300 may provide the display module 200 with various electrical signals needed to drive the display module 200. For example, the circuit substrate 300 may provide the pixel driving chip D-IC with image signals and may also provide sensing signals needed to drive the input sensing layer ISL (see FIGS. 3A and 3B). The circuit substrate 300 according to an embodiment of the inventive concept may be a substrate having flexible or rigid properties. In this specification, the circuit substrate 300 is described as a flexible printed circuit board.

Specifically, the circuit substrate 300 may include a main circuit board MB, a sensing driving chip T-IC, and a connector CNT.

The main circuit board MB may be a base layer which generally supports the sensing driving chip T-IC and a plurality of signal lines which are not illustrated.

The sensing driving chip T-IC may be disposed on the main circuit board MB. The sensing driving chip T-IC may be electrically connected to the display module 200 through the signal lines. The sensing driving chip T-IC may generate a sensing signal to sense an external input TC and may process a sensed signal. Meanwhile, the sensing driving chip T-IC and the plurality of signal lines may be disposed on the main circuit board MB.

The connector CNT may be connected to external modules. A display module, an antenna module, and the like may be electrically connected to external modules through the connector CNT. A power module, a communication module, and the like may be connected to the connector CNT.

The electronic module 400 is disposed below the window 100. The electronic module 400 may overlap the panel hole MH defined in the module region MA. The electronic module 400 may receive an external input transmitted through the module region MA or provide an output through the module region MA.

In the electronic module 400, a receiving unit for receiving an external input and an output unit for providing an output may overlap the module region MA on a plane. A portion or the whole of the electronic module 400 may be accommodated in the module region MA or the panel hole MH. According to the inventive concept, the area of the non-display region BZA may be reduced since the electronic module 400 is disposed to overlap the active region AA.

FIGS. 3A and 3B are cross-sectional views of the electronic device according to an embodiment of the inventive concept.

Referring to FIG. 3A, the base layer BL includes the base substrate SUB and the circuit element layer CL. The display module 200 may be disposed on the base layer BL. The display module 200 includes the display element layer DP-OLED, an encapsulation layer TFL, and the input sensing layer ISL disposed on the display element layer DP-OLED. The display module 200 includes the display element layer DP-OLED and the encapsulation layer TFL. The input sensing layer ISL may be disposed directly on the encapsulation layer TFL.

The base substrate SUB may include at least one plastic film. As a flexible substrate, the base substrate SUB may include a plastic substrate, a glass substrate, a metal substrate, an organic/inorganic composite material substrate, or the like. The base substrate SUB may be a member which generally supports the configurations of the circuit element layer CL.

The circuit element layer CL includes at least one intermediate insulating layer or circuit element. The intermediate layer includes at least one intermediate inorganic film and/or at least one intermediate organic film. The circuit element includes signal lines, a pixel driving circuit and the like.

The display element layer DP-OLED includes a plurality of organic light-emitting diodes. The display element layer DP-OLED may further include an organic film such as a pixel-defining film. According to an embodiment of the inventive concept, when the display panel is provided as a liquid crystal display panel, the display element layer may be provided as a liquid crystal layer.

The encapsulation layer TFL seals the display element layer DP-OLED. As an example, the encapsulation layer TFL may be a thin-film encapsulation layer. The encapsulation layer TFL protects the display element layer DP-OLED from foreign materials such as moisture, oxygen, and dust particles. However, in an embodiment, an encapsulation substrate may be provided instead of the encapsulation layer TFL. In this case, the encapsulation substrate faces the substrate SUB, and the circuit element layer CL and the display element layer DP-OLED may be disposed between the encapsulation substrate and the substrate SUB.

The input sensing layer ISL may be disposed on the encapsulation layer TFL. The input sensing layer ISL senses an input applied from the outside. The input applied from the outside may be provided in various forms. For example, an external input includes various forms of external inputs such as a portion of a user's body, a stylus pen, light, heat, or pressure. In addition, a touch input provided by a portion of a body such as a user's hand, as well as a proximate input provided in a close or adjacent space, e.g. hovering, may be a form of input.

The input sensing layer ISL may be disposed directly on the encapsulation layer TFL. In this specification, the expression "configuration A is disposed directly on configuration B" means that no adhesive layer is disposed between configuration A and configuration B. In this embodiment, the input sensing layer ISL may be manufactured by a continuous process with the display panel DP. However, in an embodiment, the input sensing layer ISL may be provided as an individual panel and coupled to the display panel DP by an adhesive layer.

FIG. 3B is a cross-sectional view of the electronic device according to an embodiment of the inventive concept. In FIG. 3B, the electronic device ED includes the base layer BL, the circuit element layer CL disposed on the base layer BL, the display element layer DP-OLED, an encapsulation substrate ES, and a sealant SM combining the base layer BL and the encapsulation substrate ES. The encapsulation layer ES may be spaced apart from the display element layer DP-OLED by a predetermined gap GP. The base layer BL and the encapsulation substrate ES may include a plastic substrate, a glass substrate, a metal substrate, an organic/inorganic composite material substrate, or the like. The sealant SM may include an organic adhesive member, frit, or the like. The input sensing layer ISL may be disposed on the encapsulation substrate ES.

Figure 4:
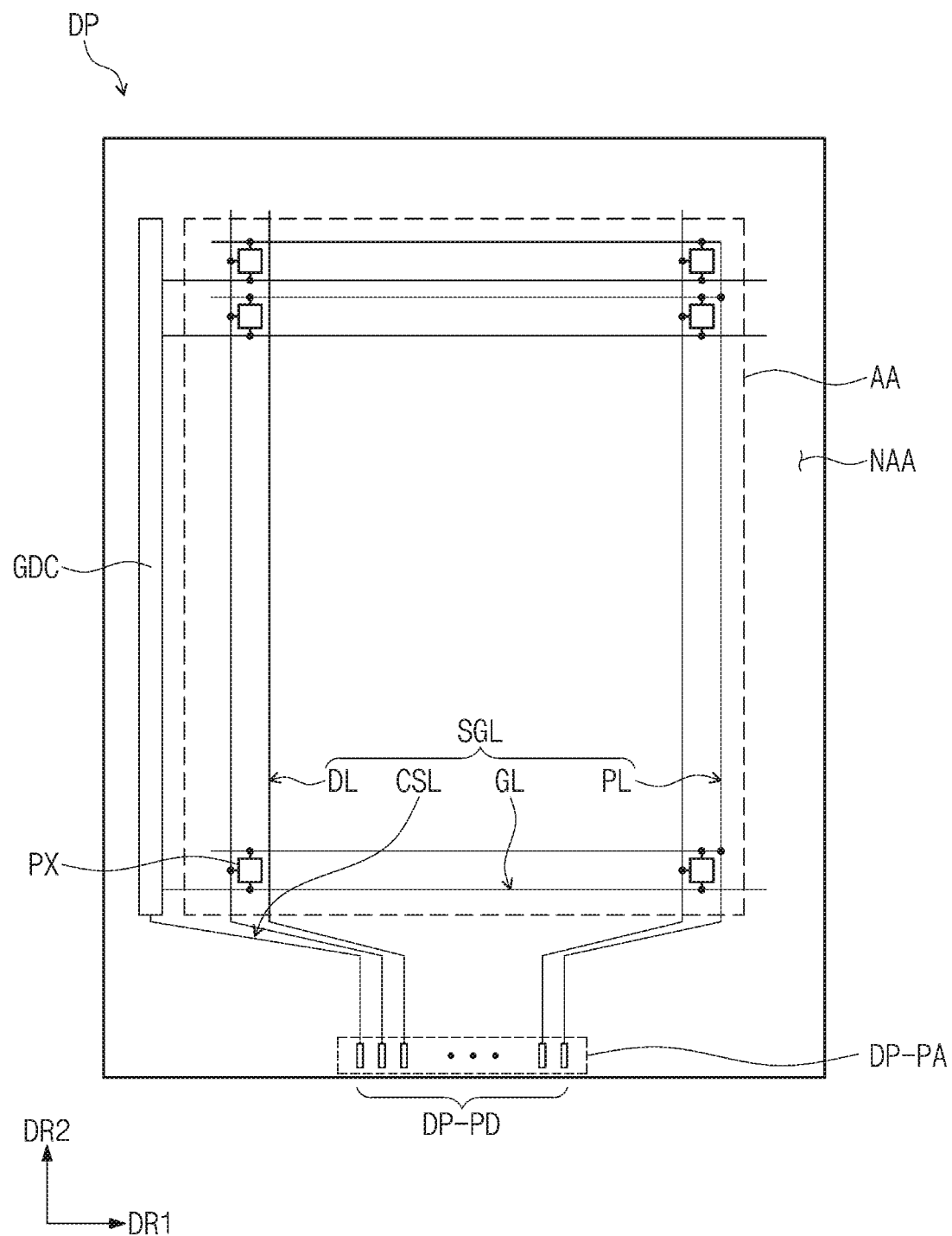
FIG. 4 is a plane view of a display panel according to an embodiment of the inventive concept.

FIG. 4 is a plane view of a display panel DP according to an embodiment of the inventive concept. In FIG. 4, the display panel DP may include the circuit element layer CL and the display element layer DP-OLED illustrated in FIGS. 2 to 3B.

As illustrated in FIG. 4, the display panel DP may include a driving circuit GDC, a plurality of signal lines SGL (hereinafter referred to as signal lines), a plurality of signal pads DP-PD (hereinafter referred to as signal pads), and a plurality of pixels PX (hereinafter referred to as pixels).

The active region AA may be defined as a region in which the pixels PX are disposed. Each of the pixels PX includes an organic light-emitting diode and a pixel driving circuit connected to the organic light-emitting diode. The driving circuit GDC, the signal lines SGL, the signal pads DP-PD, and the pixel driving circuit may be included in the circuit element layer CL illustrated in FIGS. 3A and 3B.

The driving circuit GDC may include a scan driving circuit. The scan driving circuit generates a plurality of scan signals (hereinafter referred to as scan signals) and sequentially outputs the scan signals to a plurality of scan lines GL (hereinafter referred to as scan lines) to be described later. The scan driving circuit may further output another control signal to the driving circuit of the pixels PX.

The scan driving circuit may include a plurality of thin-film transistors formed through the same process as the driving circuit of the pixels PX, such as a low temperature polycrystalline silicon (LTPS) process or a low temperature polycrystalline oxide (LTPO) process.

The signal lines SGL include scan lines GL, data lines DL, a power line PL, and a control signal line CSL. The scan lines GL are respectively connected to a corresponding pixel PX among the pixels PX, and the data lines DL are respectively connected to a corresponding pixel PX among the pixels PX. The power line PL is connected to the pixels PX. The control signal line CSL may provide the control signals to the scan driving circuit.

The signal lines SGL overlap the active region AA and the non-active region NAA. The signal lines SGL may include a pad portion and a line portion. The line portion overlaps the active region AA and the non-active region NAA. The pad portion is connected to an end of the line portion. The pad portion is disposed in the non-active region NAA and overlaps a corresponding signal pad among the signal pads DP-PD. A region in which the signal pads DP-PD are disposed in the non-active region NAA may be defined as a pad region DP-PA. The pad region DP-PA may be connected to a circuit substrate which is not illustrated.

The line portion substantially connected to the pixel PX constitutes most of the signal lines SGL. The line portion is connected to the transistors T1 and T2 (see FIG. 5) of the pixel PX. The line portion may have a single-layered/multi-layered structure, and the line portion may be a single body or include two or more parts. The two or more parts are disposed in different layers from each other and may be connected to each other through a contact hole which penetrates an insulating layer disposed between the two or more parts.

Figure 5:
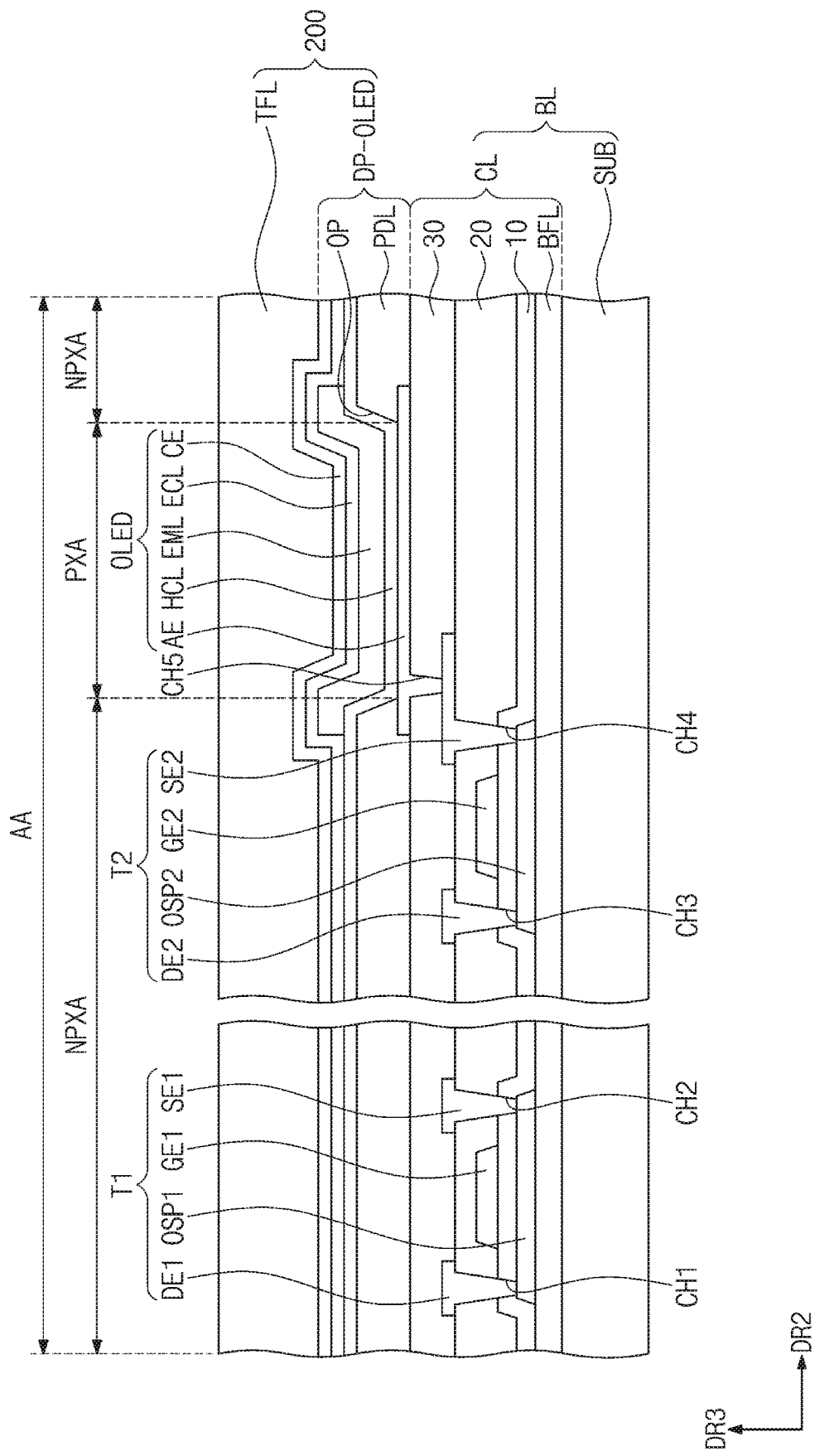
FIG. 5 is an enlarged cross-sectional view of a base layer and a display module according to an embodiment of the inventive concept.

FIG. 5 is an enlarged cross-sectional view of the base layer BL and the display module 200 according to an embodiment of the inventive concept. FIG. 5 illustrates a partial cross section of the display module 200 corresponding to the transistors T1 and T2 and a light-emitting diode OLED. The circuit element layer CL disposed on the base layer BL includes at least one insulating layer or circuit element. The circuit element includes a signal line, a pixel driving circuit, and the like. The circuit element layer CL may be formed through a process of forming an insulating layer, a semiconductor layer, and a conductive layer by coating, deposition, and the like, and a process of patterning the insulating layer, the semiconductor layer, and the conductive layer by a photolithography process.

In this embodiment, the circuit element layer CL may include an inorganic buffer film BFL, a first intermediate inorganic film 10, a second intermediate inorganic film 20, and an intermediate organic film 30. The buffer film BFL may include a plurality of stacked inorganic films. FIG. 5 illustrates, as an example, the structural relationship of a first semiconductor pattern OSP1, a second semiconductor pattern OSP2, a first control electrode GE1, a second control electrode GE2, a first input electrode DE1, a first output electrode SE1, a second input electrode DE2, and a second output electrode SE2. First to fourth penetration holes CH1 to CH4 are also illustrated as an example.

The display element layer DP-OLED may include an organic light-emitting diode OLED. The display element layer DP-OLED includes a pixel defining film PDL. For example, the pixel defining film PDL may be an organic layer.

A first electrode AE is disposed on the intermediate organic film 30. The first electrode AE is connected to the second output electrode SE2 through a fifth penetration hole CH5 which penetrates the intermediate organic film 30. An opening OP is defined in the pixel defining film PDL. The opening OP of the pixel defining film PDL exposes at least a portion of the first electrode AE. The opening OP of the pixel defining film PDL is named as a light-emitting opening to be distinguished from other openings.

As illustrated in FIG. 5, the active region AA may include a light-emitting region PXA and a non-light-emitting region NPXA adjacent to the light-emitting region PXA. The non-light-emitting region NPXA may surround the light-emitting region PXA. In this embodiment, the light-emitting region PXA is defined as corresponding to a portion of the first electrode AE exposed by the light-emitting opening OP.

A hole control layer HCL may be disposed in common in the light-emitting region PXA and the non-light-emitting region NPXA. The hole control layer HCL may include a hole transport layer and further include a hole injection layer. A light-emitting layer EML is disposed on the hole control layer HCL. The light-emitting layer EML may be disposed in a region which corresponds to the light-emitting opening OP. That is, the light-emitting layer EML may be formed to be separated from each of the pixels. The light-emitting layer EML may contain an organic material and/or an inorganic material. The light-emitting layer EML may generate a predetermined colored light.

An electronic control layer ECL is disposed on the light-emitting layer EML. The electronic control layer ECL includes an electronic transport layer and further include an electronic injection layer. The hole control layer HCL and the electronic control layer ECL may be formed in common in a plurality of pixels by using an open mask. A second electrode CE is disposed on the electronic control layer ECL. The second electrode CE has an integrated shape and is disposed in common in a plurality of pixels.

Figure 6:
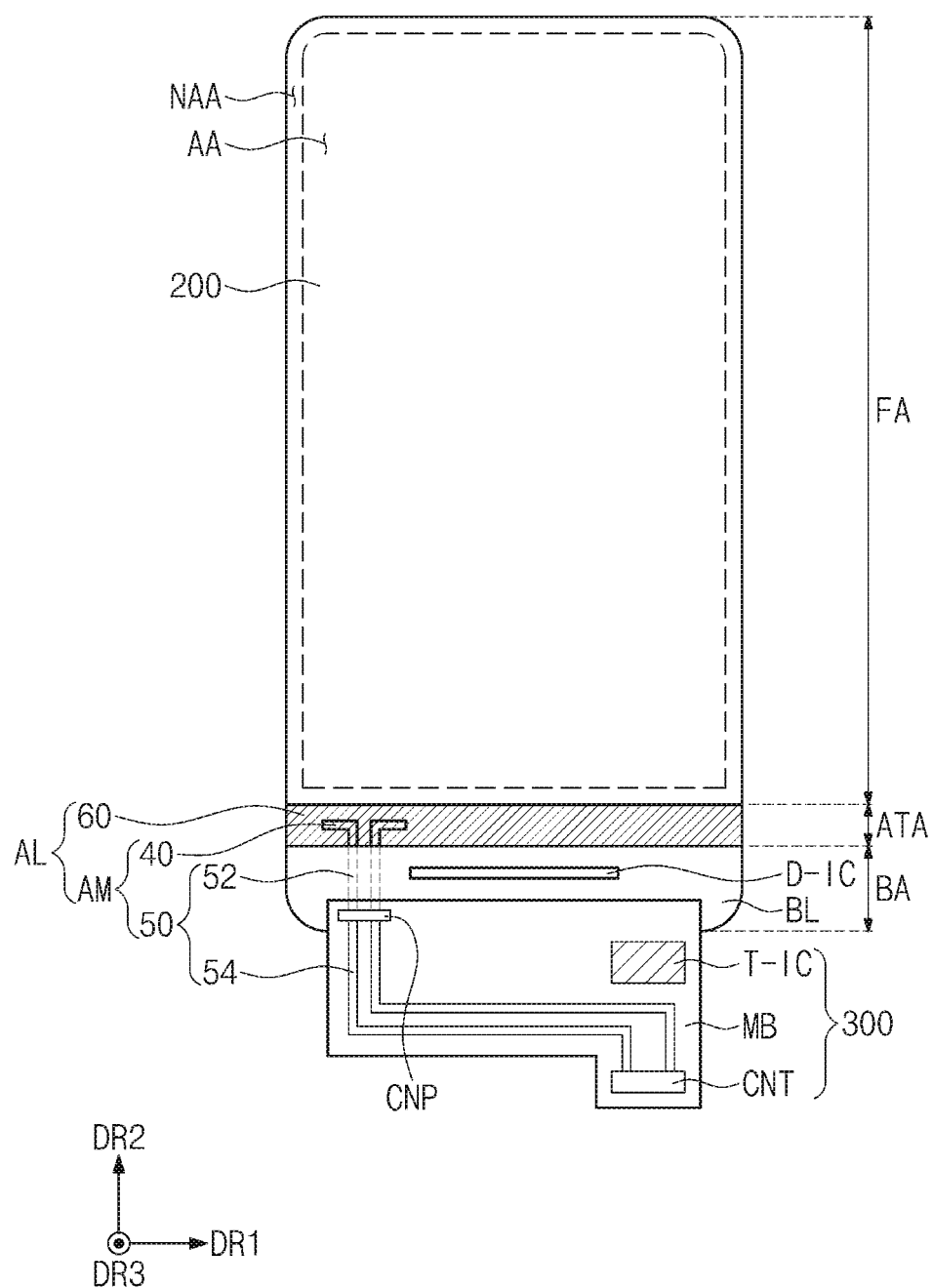
FIG. 6 is a plane view of the electronic device according to an embodiment of the inventive concept.

FIG. 6 is a plane view of the electronic device according to an embodiment of the inventive concept. FIG. 6 illustrates the display module 200, an antenna layer AL, and the circuit substrate 300 which are disposed on the base layer BL.

In FIG. 6, the antenna layer AL may be disposed on one side of the display module 200. The antenna layer AL may be disposed on the lower side of the display module 200 in the second direction DR2. The antenna layer AL may be disposed in the same layer as the display module 200 disposed on the base layer BL in the third direction DR3. In addition, in the second direction DR2, the antenna layer AL may be disposed between the display module 200 and the circuit substrate 300.

The antenna layer AL may be disposed on an antenna region ATA. The antenna region ATA may be defined on the base layer BL. The antenna region ATA may be defined between the flat region FA and the bending region BA.

The antenna layer AL may include an antenna module AM and an insulating layer 60. The insulating layer 60 may surround the antenna layer AL. That is, the antenna module AM may be disposed inside the insulating layer 60. The insulating layer 60 may be generally disposed on one side of the display module 200. That is, the insulating layer 60 may have the same width as the display module 200 in the first direction DR1. The insulating layer 60 may contain silicon (Si). The insulating layer 60 may contain a non-conductive material applied to a side surface of the display module 200.

The antenna module AM may contain a conductive material disposed inside the insulating layer 60 which contains a non-conductive material. The antenna module may contain silver (Ag) paste. The antenna module AM may be disposed in a portion inside the insulating layer 60 generally disposed on one side of the display module 200.

In an embodiment, the antenna module AM may be a dipole antenna.

The antenna module AM may include an antenna line 40 and a power supply line 50. The antenna line 40 may include a first antenna line and a second antenna line having different polarities and extending in opposite directions from each other. The lengths of the first antenna line and the second antenna line may be the same as each other. The antenna line 40 may be disposed parallel to one side of the display module 200 and the base layer BL. The power supply line 50 may extend vertically from the antenna line 40. The antenna line 40 may extend in the first direction DR1, and the power-supply line 50 may extend in the second line DR2. The power supply line 50 may include a first power supply line and a second power supply line extending respectively from the first antenna line and the second antenna line. The power supply line 50 may be electrically connected to the circuit substrate 300.

The power supply line 50 may include a first portion 52 and a second portion 54. The first portion 52 may connect the antenna line 50 and the circuit substrate 300. The second portion 54 may be disposed on the circuit substrate 300. The second portion 54 may connect the first portion 52 and the connector CNT. That is, the power supply line 50 may supply power to the antenna module AM through the connector CNT of the circuit substrate 300. The connector CNT may be connected to a power module and/or an RFID module.

The first portion 52 may cross the bending region BA of the base layer BL. The second portion 54 may cross the main circuit board MB of the circuit substrate 300. The second portion 54 may cross the main circuit board MB in a direction avoiding the sensing driving chip T-IC so as to be connected to the connector CNT. In an embodiment, the first portion 52 of the power supply line 50 may be electrically connected to the circuit substrate 300 through the circuit element layer CL (see FIG. 3A) of the base layer BL.

The second portion 54 may be connected to the first portion 52 through a connection pad CNP of the circuit substrate 300. The connection pad CNP may be disposed on the upper surface or lower surface of the circuit substrate 300.

The power supply line 50 may be connected to the circuit substrate 300 in a direction avoiding the pixel driving chip D-IC. That is, the first portion 52 of the power supply line 50 may be connected to the circuit substrate 300 by crossing a region in which the pixel driving chip D-IC is not disposed in the bending region BA.

Figure 7:
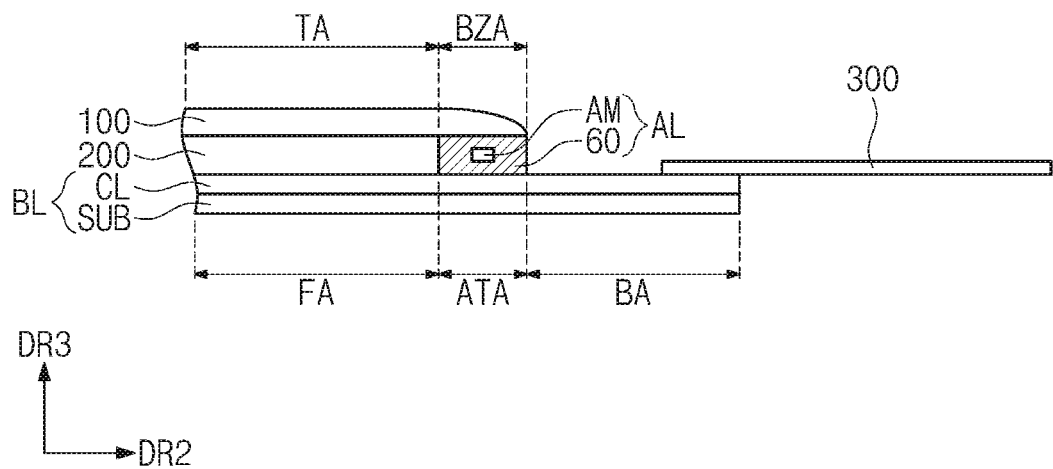
FIG. 7 is a cross-sectional view of the electronic device according to an embodiment of the inventive concept.
Figure 8:
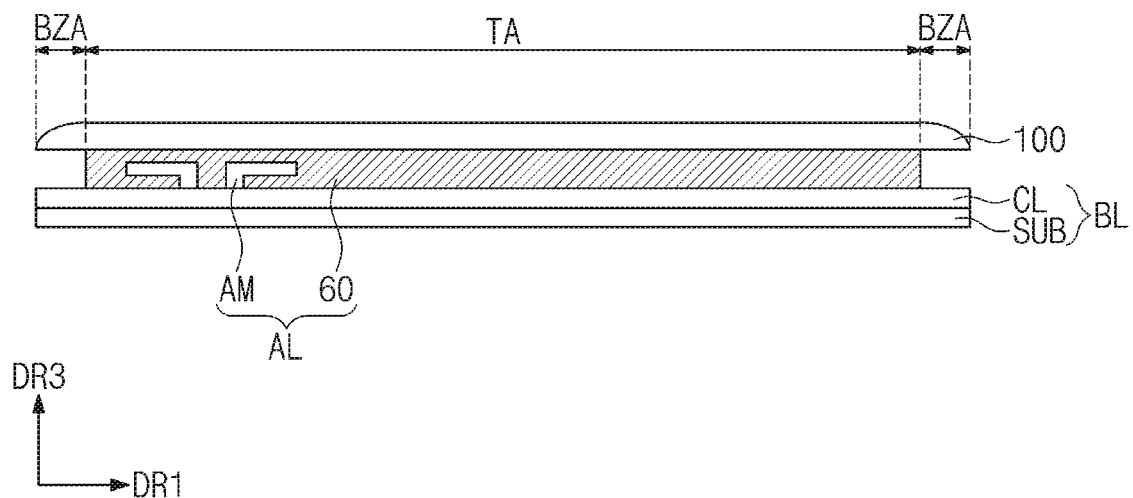
FIG. 8 is a cross-sectional view of the electronic device according to an embodiment of the inventive concept.

FIG. 7 is a cross-sectional view of the electronic device according to an embodiment of the inventive concept. FIG. 8 is a cross-sectional view of the electronic device according to an embodiment of the inventive concept.

In FIG. 7, the antenna layer AL may overlap the non-display region BZA of the window 100. The length of the window 100 is greater than that of the display module 200 in the second direction DR2. That is, the window 100 may be protruded more than the display module 200 in the second direction DR2. The antenna layer AL may be disposed between the protruded portion of the window 100 and the base layer BL in the thickness direction. The antenna layer AL may contact a side surface of the display module 200, a lower surface of the window 100, and an upper surface of the base layer BL. That is, the antenna layer AL may be disposed in the same layer as the display module 200. Accordingly, the antenna layer AL does not increase the thickness of the electronic device ED (see FIG. 1).

In an embodiment, the antenna layer AL may be disposed in the antenna region ATA. The antenna region ATA may be defined between the flat region FA and the bending region BA in the second direction DR2. The circuit substrate 300 is disposed in the bending region BA. That is, since the antenna module AM is disposed in the antenna region ATA adjacent to the bending region BA, the antenna module AM may be easily electrically connected to the circuit substrate 300. The antenna layer AL may include the insulating layer 60. The antenna module AM may be disposed inside the insulating layer 60.

FIG. 8 is a cross-sectional view of the electronic device ED of FIG. 6, which is viewed from the second direction DR2. In an embodiment, the antenna layer AL may be disposed between the window 100 and the base layer BL and entirely overlap one side of the display module 200 (see FIG. 7) which is not illustrated. The width of the insulating layer 60 of the antenna layer AL in the first direction DR1 may be the same as that of the display module 200 (see FIG. 7) in the first direction DR1. The antenna module AM may be disposed in a portion of the insulating layer 60.

Figure 9:
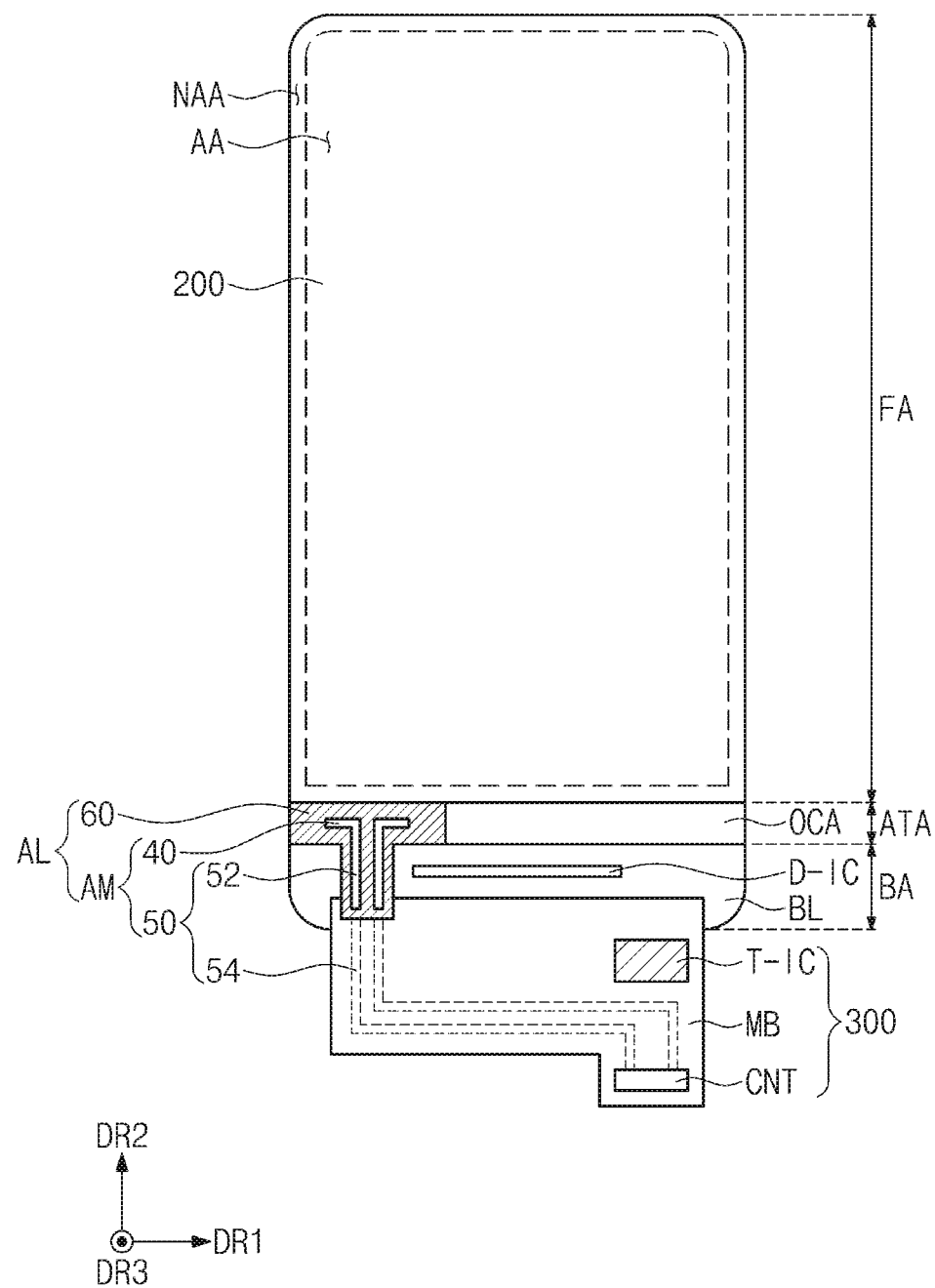
FIG. 9 is a plane view of an electronic device according to an embodiment of the inventive concept.
Figure 10:
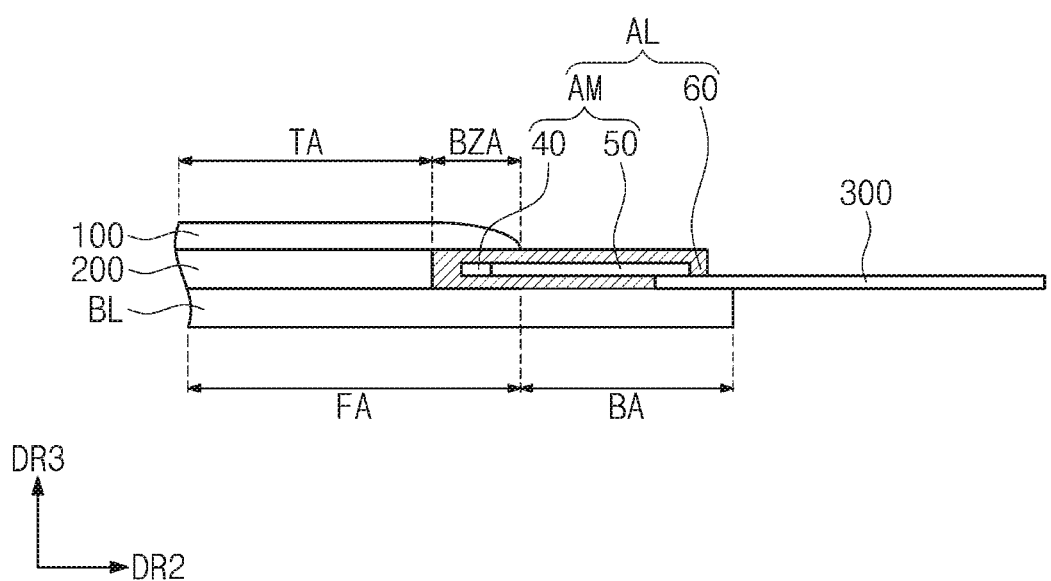
FIG. 10 is a cross-sectional view of the electronic device according to an embodiment of the inventive concept.

FIG. 9 is a plane view of an electronic device according to an embodiment of the inventive concept. FIG. 10 is a cross-sectional view of the electronic device according to an embodiment of the inventive concept.

In FIG. 9, the antenna layer AL and an adhesive member OCA may be disposed in the antenna region ATA. That is, the adhesive member OCA and the antenna layer AL may be disposed on one side of the display module 200 and the lower surface of the window 100 (see FIG. 7). That is, the adhesive member OCA may be disposed in a region in which the antenna layer is not disposed in the antenna region ATA. The adhesive member OCA may be disposed between the lower surface of the non-display region BZA (see FIG. 7) of the window 100 and the upper surface of the corresponding base layer BL.

The antenna layer AL may be disposed in the same layer as the display module 200. The antenna module AM of the antenna layer AL and the insulating layer 60 may be connected to the circuit substrate 300. The first portion 52 of the power supply line 50 extending in the vertical direction from the antenna line 40 of the antenna module AM may extend to the circuit board 300. The first portion 52 may be surrounded by the insulating layer 60.

In FIG. 10, the power supply line 50 may extend to the upper surface of the circuit substrate 300. In this embodiment, the first portion 52 of the power supply line 50 may extend to the upper surface of the circuit substrate 300 to be electrically connected to the circuit substrate 300. The insulating layer 60 may extend to the upper surface of the circuit substrate 300 while surrounding the power supply line 50 extending to the circuit substrate 300. In an embodiment, the second portion 54 of the power supply line 50 may be electrically connected to the connector CNT through the main circuit board MB.

Figure 11:
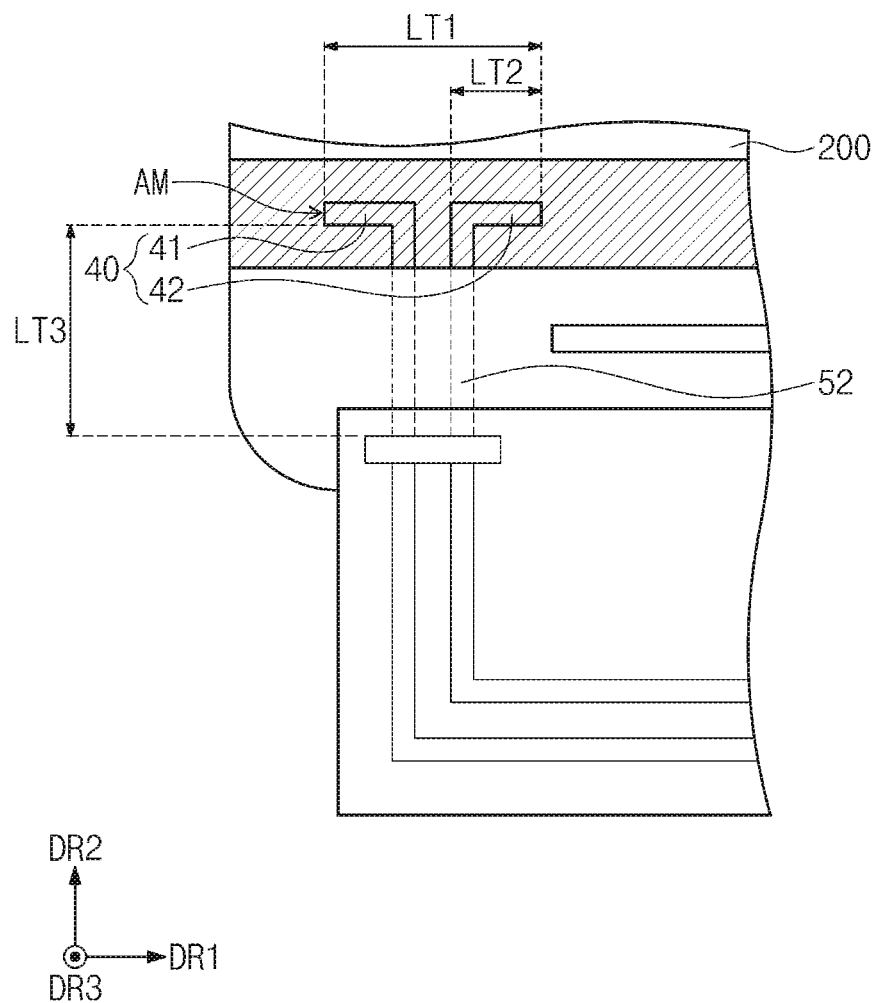
FIG. 11 is an enlarged view of an antenna module according to an embodiment of the inventive concept.

FIG. 11 is an enlarged view of the antenna module AM according to an embodiment of the inventive concept.

In FIG. 11, the antenna module AM may include a first antenna line 41 and a second antenna line 42. The antenna line 40 may be disposed parallel to the side surface of the display module 200. The first antenna line 41 and the second antenna line 42 may have different polarities from each other.

The length LT1 of the antenna line 40 may be about 5 mm. For example, the length LT1 of the antenna line 40 may be about 5.35 mm. The length may be the length of a dipole antenna corresponding to 28 GHz frequency. The length of each of the first antenna line 41 and the second antenna line 42 may be the same as each other. In this embodiment, the length of each of the first antenna line 41 and the second antenna line 42 may be about 2.14 mm. The length LT3 of the first portion 52 of the power supply line 50 may be about 4 mm, for example, about 4.15 mm. This figure is an example for indicating an approximate size of the antenna module AM, and other sizes of the antenna module AM are used in other examples.

In accordance with the inventive concept, signal interference may be minimized by disposing an antenna in a side space of a display module and preventing an increase in thickness by utilizing the space efficiently.

As described above, the embodiments of the inventive concept have been disclosed in the drawings and specifications. Although specific terms have been used herein, these are used for the purpose of describing the inventive concept, and are not used to limit the meaning or the scope of the inventive concept described in the claims. Therefore, those of ordinary skill in the art will understand that various modifications and other equivalent embodiments are possible from this. Accordingly, the true technical protection scope of the inventive concept should be determined by the technical idea of the appended claims.

What is claimed is:

1. An electronic device comprising:
   a base layer including a flat region and a bendable region extending from the flat region;
   a display module disposed on the base layer and overlapping the flat region;
   a window disposed on the display module and having a display region and a non-display region adjacent to the display region; and
   an antenna layer overlapping the non-display region and contacting one side of the display module extending perpendicularly from the flat region, wherein the antenna layer further contacts a lower surface of the window and an upper surface of the base layer; and
   wherein the antenna layer comprises an antenna module and an insulating layer surrounding the antenna module.

2. The electronic device of claim 1, wherein:
   the base layer comprises a base substrate and a circuit element layer disposed on the base substrate; and
   the display module comprises a display element layer disposed on the circuit element layer and an input sensing layer disposed on the display element layer.

3. The electronic device of claim 1, wherein the antenna module comprises a dipole antenna.

4. The electronic device of claim 1, wherein the antenna module contains silver (Ag) paste.

5. The electronic device of claim 1, wherein the antenna module comprises an antenna line disposed parallel to the one side of the display module and a power supply line extending from the antenna line.

6. The electronic device of claim 5, wherein a width of the antenna line in a first direction is about 5 mm.

7. The electronic device of claim 1, wherein the base layer further comprises an antenna region defined between the flat region and the bendable region.

8. The electronic device of claim 7, wherein the antenna layer is disposed on the antenna region.

9. The electronic device of claim 8, further comprising a circuit substrate which is disposed on the bendable region and drives the display module.

10. The electronic device of claim 9, wherein the antenna module comprises an antenna line radiating an antenna signal and a power supply line vertically extending from the antenna line,
    wherein the power supply line is electrically connected to the circuit substrate.

11. The electronic device of claim 10, further comprising a pixel-driving chip which is disposed closer to the display module than the circuit substrate on the bendable region.

12. The electronic device of claim 1, further comprising a circuit substrate which is disposed on one side of the base layer and electrically connected to the display module,
    wherein the antenna module is disposed between the display module and the circuit substrate on the base layer.

13. The electronic device of claim 12, wherein the antenna module is electrically connected to the circuit substrate.

14. An electronic device comprising:
    a base layer including a flat region and a bendable region extending from the flat region;
    a display module disposed on the base layer and overlapping the flat region;
    a window disposed on the display module and having a display region and a non-display region adjacent to the display region;
    an antenna layer overlapping the non-display region and disposed on one side of the display module;
    wherein the antenna layer comprises an antenna module and an insulating layer surrounding the antenna module,
    wherein the base layer further comprises an antenna region defined between the flat region and the bendable region,
    wherein the antenna layer is disposed on the antenna region,
    a circuit substrate which is disposed on the bendable region and drives the display module; and
    wherein the antenna module comprises an antenna line radiating an antenna signal and a power supply line vertically extending from the antenna line,
    wherein the power supply line is electrically connected to the circuit substrate,
    a pixel-driving chip which is disposed closer to the display module than the circuit substrate on the bendable region,
    wherein the power supply line is connected to the circuit substrate across a region in which the pixel-driving chip is not disposed on the bendable region.

15. An electronic device comprising:
    a base layer including a flat region and a bendable region extending from the flat region;
    a display module disposed on the base layer and overlapping the flat region;
    a window disposed on the display module and having a display region and a non-display region adjacent to the display region;
    an antenna layer overlapping the non-display region and disposed on one side of the display module; and
    wherein the antenna layer comprises an antenna module and an insulating layer surrounding the antenna module,
    wherein the base layer further comprises an antenna region defined between the flat region and the bendable region,
    wherein the antenna layer is disposed on the antenna region,
    a circuit substrate which is disposed on the bendable region and drives the display module,
    wherein the antenna module comprises an antenna line radiating an antenna signal and a power supply line vertically extending from the antenna line,
    wherein the power supply line is electrically connected to the circuit substrate, wherein: the circuit substrate comprises a connector; and the power supply line comprises a first portion connecting the antenna line and the circuit substrate, and a second portion electrically connected to the connector across the circuit substrate.

16. An electronic device comprising:
a base layer comprising a first region and a second region adjacent to the first region;
a display module comprising a display element layer disposed on the first region of the base layer;
a circuit substrate disposed on the second region of the base layer and driving the display module; and
an antenna layer disposed on the base layer and disposed, on a plane, between the display module and the circuit substrate, the antenna layer contacting one side of the display module extending perpendicularly from the first region, wherein a thickness of the antenna layer is the same as a thickness of the display module; and
wherein the antenna layer comprises an antenna module electrically connected to the circuit substrate.

17. The electronic device of claim 16, wherein the antenna layer is disposed in the same layer as the display module.

18. The electronic device of claim 16, wherein:
the antenna module comprises an antenna line extending in a first direction; and a power supply line extending vertically from the antenna line in a second direction crossing the first direction,
wherein the power supply line electrically connects the circuit substrate and the antenna line.

19. The electronic device of claim 16, wherein the antenna module comprises a dipole antenna.

20. The electronic device of claim 16, wherein the antenna layer further comprises an insulating layer surrounding the antenna module.

* * * * *